US012048995B2

(12) United States Patent
Sontag et al.

(10) Patent No.: US 12,048,995 B2
(45) Date of Patent: Jul. 30, 2024

(54) MULTIPURPOSE TOOL FOR FLIGHT ATTENDANT

(71) Applicant: Airbus Operations GmbH, Hamburg (DE)

(72) Inventors: Stephan Sontag, Hamburg (DE); Andrew Muin, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 741 days.

(21) Appl. No.: 17/209,319

(22) Filed: Mar. 23, 2021

(65) Prior Publication Data

US 2021/0299840 A1 Sep. 30, 2021

(30) Foreign Application Priority Data

Mar. 25, 2020 (DE) ......................... 102020108193.6

(51) Int. Cl.

| | |
|---|---|
| ***B25F 1/00*** | (2006.01) |
| ***B25G 1/04*** | (2006.01) |
| ***B25G 3/38*** | (2006.01) |

(52) U.S. Cl.

CPC .................. *B25F 1/00* (2013.01); *B25G 1/04* (2013.01); *B25G 3/38* (2013.01)

(58) Field of Classification Search

CPC ................ B25F 1/00; B25G 1/04; B25G 3/38

See application file for complete search history.

(56) References Cited

U.S. PATENT DOCUMENTS

| | | | | | |
|---|---|---|---|---|---|
| 881,782 | A * | 3/1908 | Elliot | A01B 1/022 | 294/51 |
| 2,750,616 | A * | 6/1956 | Klugmann | A46B 5/0083 | 15/166 |
| 5,177,847 | A | 1/1993 | Ottone | | |
| 5,810,408 | A * | 9/1998 | Armstrong | A46B 5/0075 | 294/51 |
| 6,155,620 | A * | 12/2000 | Armstrong | B25G 3/38 | 294/7 |
| 6,397,420 | B1 | 6/2002 | Roxton | | |
| 7,293,317 | B2 * | 11/2007 | Tsuchiya | A47L 13/24 | 15/147.2 |
| 8,100,035 | B1 | 1/2012 | Smith | | |
| 8,621,963 | B2 * | 1/2014 | Johnson | B25B 23/16 | 81/177.5 |
| 9,119,337 | B2 * | 9/2015 | Frati | A01B 1/022 | |
| 10,059,007 | B1 | 8/2018 | O'Connor et al. | | |

(Continued)

FOREIGN PATENT DOCUMENTS

| | | |
|---|---|---|
| DE | 69104941 | 5/1995 |
| DE | 20217684 U1 | 7/2003 |
| DE | 60032965 T2 | 10/2007 |

(Continued)

*Primary Examiner* — Stephen A Vu

(74) *Attorney, Agent, or Firm* — Greer, Burns & Crain, Ltd.

(57) ABSTRACT

A multipurpose tool for flight attendants includes a telescopic arm on which two handle elements are articulated at opposite ends, which handle elements can be folded in so as to lie adjacent to one another. By folding the handle elements apart and extending the telescopic arm, the multipurpose tool can be used in a variety of ways. In addition, fold-out tools may likewise be arranged on the multipurpose tool.

11 Claims, 5 Drawing Sheets

(56) References Cited

U.S. PATENT DOCUMENTS

2017/0348830 A1 * 12/2017 Lazenby ................ B26B 17/00

FOREIGN PATENT DOCUMENTS

| | | | |
|---|---|---|---|
| DE | 102007050018 | A1 | 5/2008 |
| DE | 202010002219 | U1 | 5/2010 |
| DE | 102015012397 | A1 | 3/2017 |
| DE | 112018003778 | B4 | 6/2022 |

* cited by examiner

MULTIPURPOSE TOOL FOR FLIGHT ATTENDANT

CROSS-REFERENCES TO RELATED APPLICATIONS

This application claims the benefit of the German patent application No. 102020108193.6 filed on Mar. 25, 2020, the entire disclosures of which are incorporated herein by way of reference.

BACKGROUND OF THE INVENTION

The present invention relates to a multipurpose tool for flight attendants, and relates, in particular, to a multipurpose tool having two handle elements which are articulated on opposite ends of a telescopic arm and which can be folded in so as to lie adjacent to one another.

In aircraft and some other means of mass transportation, such as, for example, ships, buses or trains, overhead luggage compartments are arranged in the region of the ceiling. The luggage compartments, which are normally provided above passenger seats, are open toward an aisle running adjacent to the seats and are closed by means of a flap. In the opened state of the flap, the free end thereof is situated in the ceiling region of the passenger cabin and thus high above the aisle.

Depending on the construction of the aircraft and/or the height of the passenger or of the flight attendant, it can be difficult to reach the free end in order to close the flap. Therefore, in order to reach and close the luggage compartment flap, the person in question often climbs onto a step provided on a passenger seat, or even climbs fully onto the seat, in order to be able to grip the flap. This not only presents risks to the person in question but also requires a correspondingly stable construction of the seat, whereby this is made heavier.

Some flight attendants have also obtained a long hooked article that they bring with them into the vehicle in order to reach the free end of an open flap and pull it downward. This self-created tool is not only aesthetically unsightly and clearly exposes the deficiency of the flaps situated at a great height, but it also constitutes a safety hazard if it is not correctly stowed after use.

SUMMARY OF THE INVENTION

The invention is therefore based on an object of providing a tool which is versatile in use and which is at the same time also lightweight and inexpensive.

According to a first aspect for improved understanding of the present disclosure, a multipurpose tool for flight attendants comprises a telescopic arm, a first handle element which is articulated on a first end of the telescopic arm, and a second handle element which is articulated on a second end of the telescopic arm. The first handle element and the second handle element are, in particular, configured to be laid against the telescopic arm, the first handle element and the second handle element being situated adjacent to one another when the telescopic arm has been collapsed.

The telescopic arm can be collapsed or pushed together such that it has a minimum length. In its extended state, the telescopic arm has its maximum length. The telescopic arm can assume any desired length in between. For example, the telescopic arm may have a length of between 5 and 15 cm, preferably between 7 and 10 cm, in the collapsed state, whereas it may have a length of between 15 and 50 cm, preferably between 25 and 45 cm and particularly preferably 40 cm, in the extended state.

By means of the articulated handle elements on the respective opposite ends of the telescopic arm, a flight attendant can hold one handle element in their hand and use the other handle element to touch or pick up a remote object. By means of the rotatable arrangement of the handle elements on the telescopic arm, the overall length of the telescopic arm can be increased yet further, for example if both handle elements are folded out and extend away from the respective end of the telescopic arm substantially in a longitudinal direction of the telescopic arm. In particular, by means of the extended telescopic arm and the handle element at the remote end, a flap of an overhead luggage compartment can be reached and pulled downward. Here, a flight attendant can pull the flap of the luggage compartment downward until the flap can be reached with the other hand and manually closed. In this way, the multipurpose tool offers a simple and inexpensive solution for closing opened luggage compartment flaps situated at a great height, entirely without additionally installed mechanical or electrical aids.

The articulated first or second handle element rotates about a respective rotary axle, the rotary axles being arranged at opposite ends of the telescopic arm (the first end and the second end of the telescopic arm). For example, at the first and the second end of the telescopic arm, there is provided a joint at which the first and the second handle element is articulated, that is to say, fastened rotatably relative to the telescopic arm. Here, each of the handle elements can be rotated relative to the telescopic arm and moved into a stowage position in which the first and the second handle element lies, at least in certain sections, parallel to the telescopic arm. Here, the first and the second handle element can be laid against the telescopic arm (moved into their respective stowage position) such that they themselves come to lie adjacent to one another. In this way, the multipurpose tool can be folded together into a very compact form and easily stowed.

By means of its two handle elements, the multipurpose tool can also be used for other purposes. For example, the multipurpose tool can be used in the manner of a brush or a shovel in order to move or pick up discarded articles (for example tissues, napkins, etc.). Also, through corresponding arrangement of one or both handle elements, the multipurpose tool can be used in the manner of an elongated hook, for example in order to pick up articles or reach articles and items of luggage in a rear region of an overhead luggage compartment and move them forward.

The first and the second end of the telescopic arm may be a telescopic segment of the telescopic arm. Alternatively, the first end and/or the second end of the telescopic arm may be a separate end piece which is connected to the respective final telescopic segment of the telescopic arm. Here, the respective rotary axle of the first and of the second handle element is provided on the respective end piece. The use of end pieces makes it possible to provide an external shape of the multipurpose tool which is visually appealing and which allows the multipurpose tool in the folded-in state to be easily held in the hand.

For the optional case that the telescopic arm is equipped with two opposite end pieces, each of the end pieces may have a surface which faces toward the respective other end piece. Here, the two surfaces of the end pieces may have corresponding shapes. The end pieces with their corresponding surfaces can thus be brought together such that the two surfaces lie against one another, in particular when the telescopic arm has been collapsed.

In one implementation variant, the multipurpose tool may comprise a first tool with a pointed free end. The first tool may be articulated on the first or second end of the telescopic arm. For example, the first tool may be configured to open a cover for an oxygen mask storage compartment of an aircraft and/or activate an automatic oxygen mask ejection means.

In another implementation variant, the multipurpose tool may comprise a second tool with a flat free end. Here, the second tool may be articulated on the first or the second end of the telescopic arm and be configured to open or operate a cover for an oxygen mask storage compartment in an aircraft and/or activate an automatic oxygen mask ejection means.

The storage boxes for oxygen masks in aircraft must be checked at regular intervals. This includes not only the checking of the correct number of oxygen masks but also the correct triggering of an automatic opening of the cover of the storage boxes. The tools required for this are of pin-shaped form and are equipped with a pointed free end or a flat free end. These tools have hitherto been provided in aircraft in a form similar to a screwdriver or similar pin-shaped tools. Owing to their small size and infrequent use, such tools are, however, commonly lost. With the integration into the multipurpose tool disclosed here, which is used much more frequently by flight attendants and is thus less frequently misplaced, the likelihood of the tools being lost and/or having to be searched for, for long periods of time, is reduced.

In a further implementation variant, the first handle element may have a recess in which the first tool is arranged. Alternatively, the second handle element may have a recess in which the first tool is arranged. For example, the tool may be arranged in the recess when the respective handle element is laid against the telescopic arm. It is self-evidently also possible for the respective tool to always be stowed in the recess for as long as it is not required, irrespective of a position of the handle element relative to the telescopic arm. Likewise, it is also possible for the first and second handle elements to have a respective recess in which one or both of the first and the second tool is/are arranged when the handle elements have been laid against the telescopic arm. In this way, not only can a compact multipurpose tool be realized, but the first and second tool are concealed by the corresponding handle element, whereby it is also possible for injuries to be avoided.

In a yet further implementation variant, the first handle element and/or the second handle element may have an outer coating at least in certain sections. The coating serves primarily for improved adhesion of the handle element on an article, in order to improve the grip of the handle element. For example, the coating may be composed of a material which has a rough surface or a highly adherent surface. The coating may preferably comprise a rubber lining.

Alternatively, the material of the handle element may be roughened in order to increase the adhesion characteristics of the handle element.

In another implementation variant, the multipurpose tool may furthermore comprise a locking device which is arranged in the telescopic arm and which is configured to block a collapse of the telescopic arm. In particular, if it is intended to use the multipurpose tool in the extended state of the telescopic arm, it is advantageous if the telescopic arm maintains its extended length. Here, the telescopic arm may comprise at least two segments which are configured for being rotated relative to one another about a longitudinal axis of the telescopic arm. Furthermore, the locking device may be configured to be activated and deactivated by relative rotation of two of the segments. For example, the locking device may be fastened to one or both of the two segments such that, when the corresponding segment is rotated, one section of the locking device is rotated conjointly. For example, the locking device may be implemented in the form of a rotary fastener or of a bayonet fastener.

In a further implementation variant, the first handle element and/or the second handle element may be of two-part form. Here, the two parts of the two-part handle element may be arranged rotatably on the respective end of the telescopic arm. By means of the two-part handle element, certain articles can be gripped more easily. For example, an arched handle, strap or grip of a bag can be received between the two parts of the handle element, the handle element can be turned, and thus the bag can be moved or lifted using the multipurpose tool.

For example, both parts of the two-part handle element may have a common rotary axle by which they are articulated on the telescopic arm. Here, the two parts of the handle element may point in the same direction or may be arranged at an angle with respect to one another on the end of the telescopic arm. In this way, the variety of possible uses of the multipurpose tool can be increased.

In a further implementation variant, the other of the first and the second handle element may be of single-part form. In this way, the single-part handle element can be easily used as a handgrip, whereby the multipurpose tool can be easily gripped and controlled. In particular in combination with an adhesion-improving coating or rough surface of the handle element, the multipurpose tool can be controlled and used safely.

Furthermore, the single-part handle element allows the latter to be arranged between the two parts of the two-part handle element when the first and the second handle element are lying against the telescopic arm. In this way, the handle elements can be nested one inside the other and stowed in a very compact form.

In a yet further implementation variant, a detent means may be provided between the first handle element and/or the second handle element and the first end and/or second end, respectively, of the telescopic arm. The detent means is a surface structure or device which holds the handle element fixed in particular rotational angle positions relative to the telescopic arm. To rotate the handle element about its rotary axle relative to the telescopic arm, it is firstly necessary for a resistance generated by the detent means to be overcome. The detent means may comprise a multiplicity of positions in a radial direction about the rotary axle, in which positions the handle element is held fixed relative to the telescopic arm. Alternatively, the detent means may also be implemented merely by friction between the handle element and the respective end of the telescopic arm, whereby it is made possible for the handle element to be secured in a continuously variable manner.

Finally, the multipurpose tool can, in the fully folded-in state, be easily stowed in a bag, wherein the multipurpose tool requires just as little space as, for example, a mobile telephone.

Furthermore, the above-described implementation variants and examples may self-evidently be combined, without this being explicitly described. Each of the described implementation variants is thus to be regarded as optional with regard to each of the configurations and variants or even combinations thereof. The present disclosure is also not limited to the individual configurations and implementation variants in the sequence described, or to a particular combination of the implementation variants.

BRIEF DESCRIPTION OF THE DRAWINGS

Preferred exemplary embodiments of the invention will now be explained in more detail with reference to the appended schematic drawings, in which.

DETAILED DESCRIPTION OF THE PREFERRED EMBODIMENTS

Figure 1:
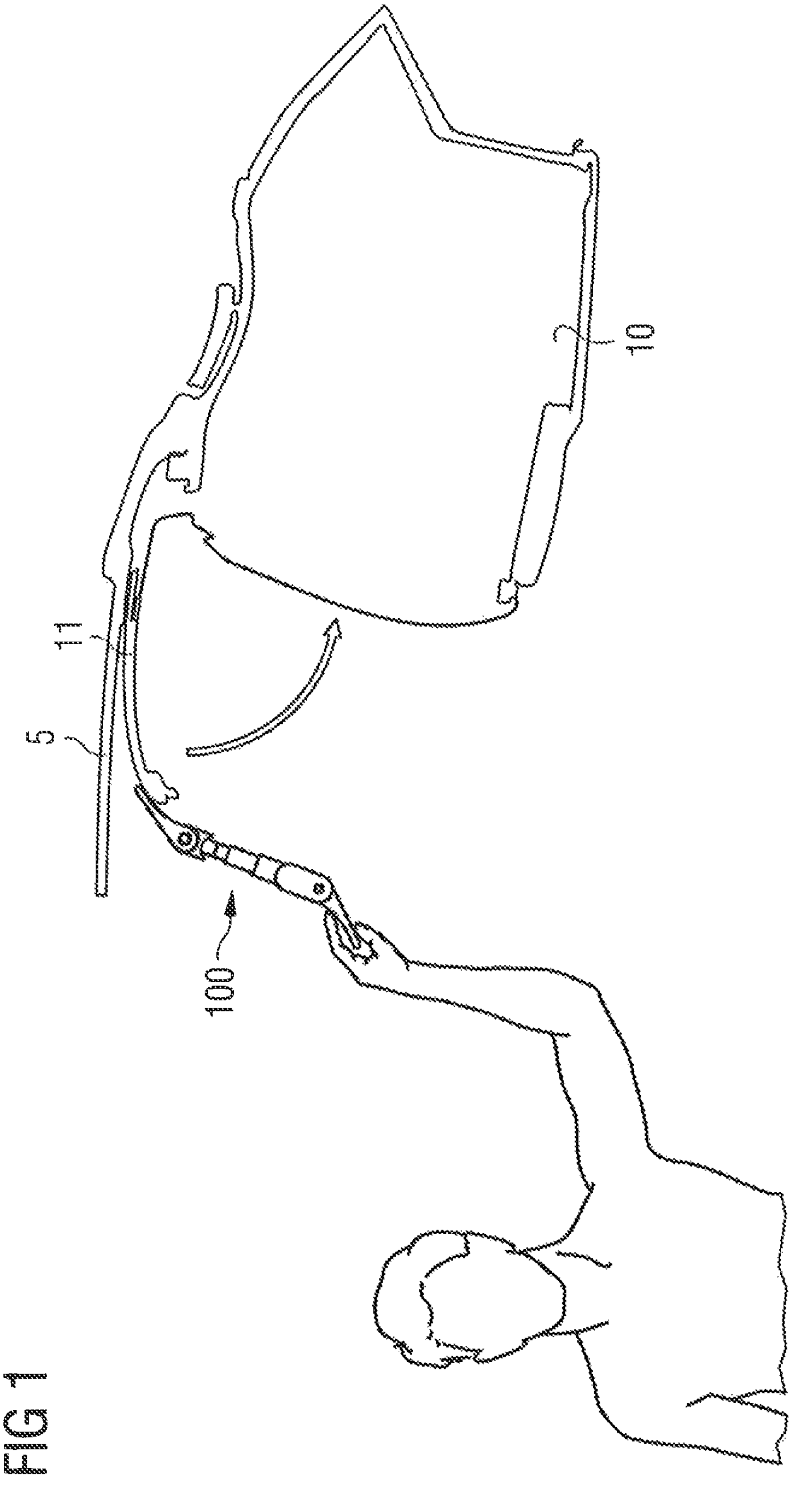
FIG. 1 shows a schematic view of a multipurpose tool during use.

FIG. 1 shows a schematic view of a multipurpose tool 100 during use. For example, overhead luggage compartments 10 may be equipped with a flap 11 which, when opened, is arranged close to a ceiling element 5 of a vehicle. In this high position, it is often difficult for persons to reach and close the flap 11. By means of the multipurpose tool 100, which is extendable in terms of its longitudinal extent, it is possible for the flap 11 to be easily reached and pulled downward and the luggage compartment 10 thus closed.

FIGS. 2A-2E schematically show sectional views of a multipurpose tool 100 in various states. In the upper state shown in FIG. 2A, the multipurpose tool 100 is illustrated in a folded-together state. The multipurpose tool 100 comprises a telescopic arm 110, having a first handle element 120 on a first end 111 of the telescopic arm 110 and having a second handle element 130 on a second end 112 of the telescopic arm 110. For example, the first and the second handle element 120, 130 are in each case articulated on the respective end 111, 112 of the telescopic arm 110.

In the folded-together or folded-in state (FIG. 2A), the first and the second handle element 120, 130 are laid against the telescopic arm 110, which in this state is collapsed, that is to say, has its minimum length. The first and the second handle element 120, 130 are furthermore configured to lie adjacent to one another when they have been folded in. In particular, the handle elements 120, 130 are shaped such that they come to lie adjacent to one another in the folded-in state.

The multipurpose tool 100 comprises a first tool 180 which has a pointed free end. In FIG. 2, the first tool 180 is illustrated in a folded-out position in the state shown in FIG. 2B. The first tool 180 is articulated on the first end 111 of the telescopic arm 110. For example, the first tool 180 may be rotatable about the same rotary axle 114 as the first handle element 120. The first tool 180 may, for example, be used for opening and/or operating a cover for an oxygen mask storage compartment of an aircraft.

Figure 2A:
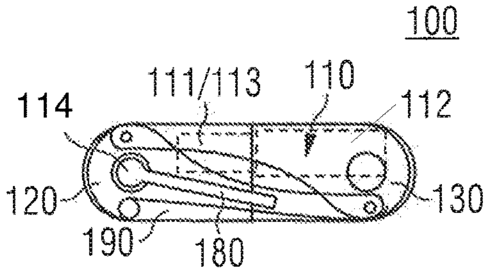
FIGS. 2A-2E show schematic sectional views of a multipurpose tool in various states.
Figure 2B:
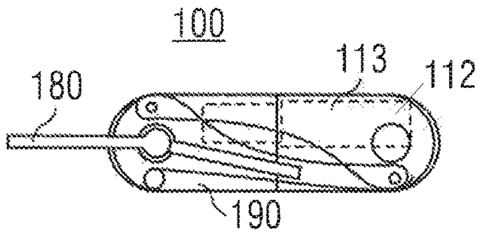
Figure 2C:
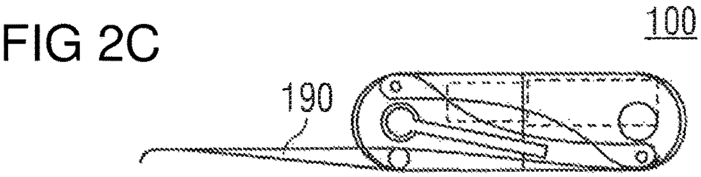

A second tool 190 is likewise articulated on the end 111 of the telescopic arm 110. In FIG. 2C, the second tool 190 is illustrated in a folded-out position. The second tool 190 has a flat free end, which can be used, for example, in order to open or operate a cover for an oxygen mask storage compartment in an aircraft. Here, the second tool 190 may be rotatable about a further rotary axle 114*a* which differs from the rotary axle 114 of the first tool 180. Furthermore, the further rotary axle 114*a* may be arranged at any desired position of the first end 111. The two tools 180, 190 may self-evidently also be arranged so as to be rotatable about the same rotary axle 114.

Figure 2D:
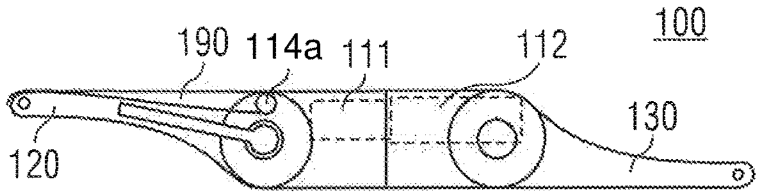

In FIG. 2D, the first and the second handle element 120, 130 are illustrated in a folded-out position. As a result of the handle elements 120, 130 being folded out, the length of the multipurpose tool 100 is made considerably greater. Furthermore, the multipurpose tool 100 can be held at one handle element 120, 130, while the other handle element 120, 130 serves as a tool.

Furthermore, the second tool 190 is illustrated as being rotatable about a rotary axle 114*a* which is situated on a different side than in FIG. 2C. In each of FIGS. 2A to 2D, the telescopic arm 110 is in a collapsed state.

Figure 2E:
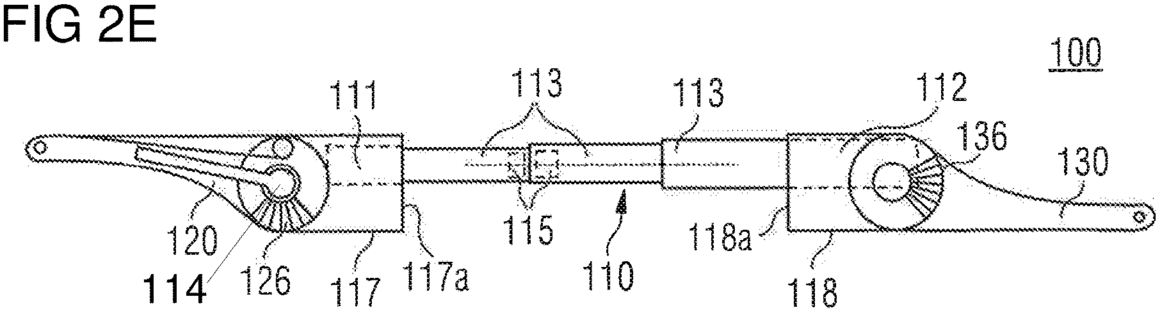

In FIG. 2E, the telescopic arm 110 is illustrated in its extended state. The telescopic arm 110 may comprise a multiplicity of segments 113, wherein FIG. 2E illustrates three segments 113 which can be pushed one inside the other. In order to fix the telescopic arm 110 in the extended state in order to prevent an inadvertent collapse of the telescopic arm, a locking device 115 can be arranged on or in the telescopic arm 110. The locking device 115 may be implemented for example in the form of a rotary fastener or of a bayonet fastener, such that the segments 113 can be fixed in a particular position. For example, two of the segments 113 can be rotated relative to one another (about a longitudinal axis of the telescopic arm 110), and the locking device 115 activated or deactivated in the process. This rotational movement is illustrated, for example, in FIG. 4. Furthermore, further locking devices 115 (not separately illustrated) may be arranged between further segments.

Figure 3:
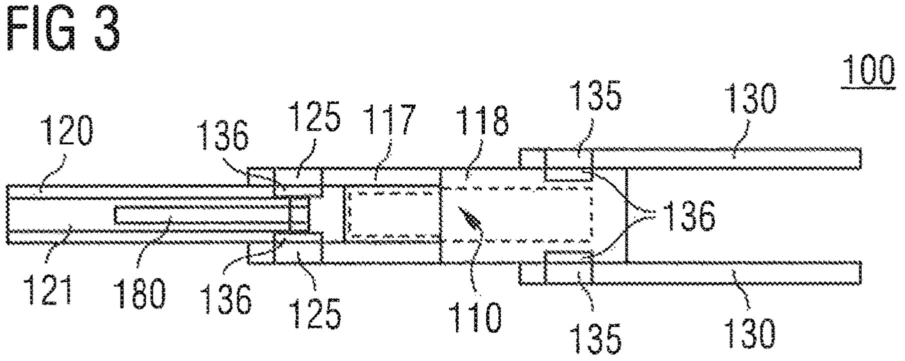
FIG. 3 schematically shows a plan view of a multipurpose tool.
Figure 4:
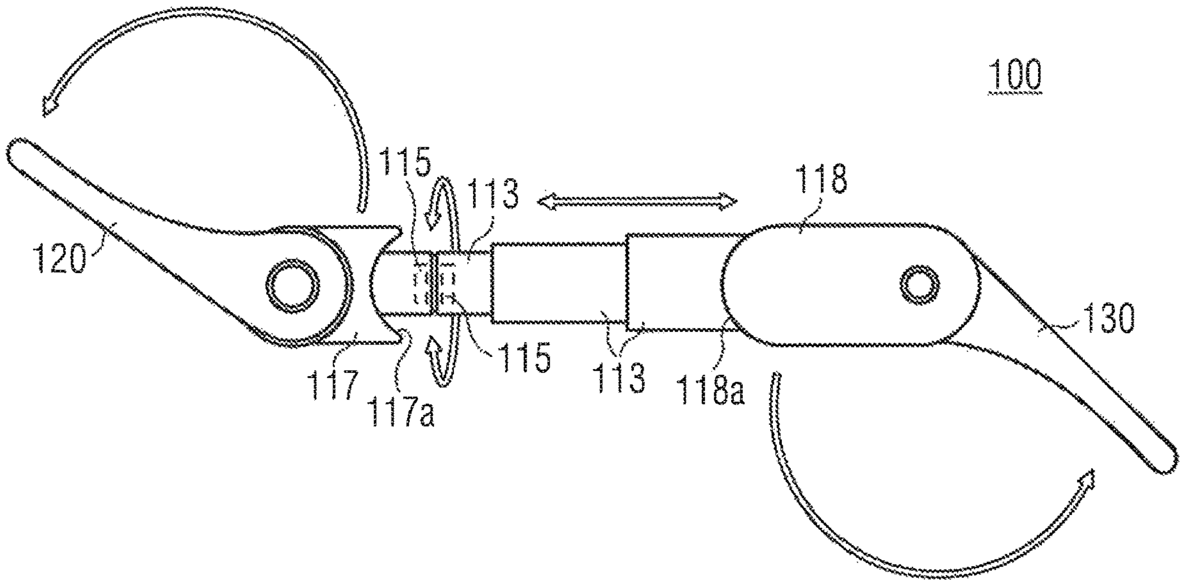
FIG. 4 schematically shows a side view of a multipurpose tool.

As is also illustrated in more detail in FIGS. 3 and 4, the first and the second handle element 120, 130 can be folded out into any desired position. For this purpose, joints 125, 135 are provided, by means of which the handle elements 120, 130 are rotatably fastened to the telescopic arm 110. Furthermore, detent means 126, 136 may be arranged on or in the joints 125, 135 and/or on or in surfaces of the handle elements 120, 130 and of the telescopic arm 110, which detent means allow the respective handle element 120, 130 to be arrested with detent action in different rotational angle positions. In this way, the positions of the handle elements 120, 130 can be fixed in any desired rotational angle position in non-positively locking and/or positively locking fashion. Merely by way of example, the detent means 126, 136 may be implemented in the form of channels, grooves and elevations which extend preferably in a radial direction around the rotary axle of the respective handle element 120, 130.

The handle elements 120, 130 may be articulated directly on the telescopic arm 110, for example on a respective outer segment 113 of the telescopic arm 110. Alternatively or in addition, it is also possible for a first end piece 117 and a second end piece 118 to be arranged on the first end 111 and the second end 112 of the telescopic arm 110. By means of the end pieces 117, 118, the handle elements 120, 130 can be more easily fastened to the telescopic arm 110.

Furthermore, the end pieces 117, 118 may have surfaces 117*a* and 118*a* which face toward one another and which have corresponding shapes. In the pushed-together state of the telescopic arm 110, the surfaces 117*a* and 118*a* of the end pieces 117, 118 may lie against one another, such that the multipurpose tool 100 assumes a compact form. Here, the surfaces 117*a* and 118*a* may have any desired shape, for example smooth planar surfaces (see FIG. 2) or a concave or convex shape (see FIG. 4). In the case of a non-planar surface, a rotation of the individual segments 113 of the telescopic arm 110 can be prevented when the telescopic arm 110 is in the collapsed state.

Figure 6:
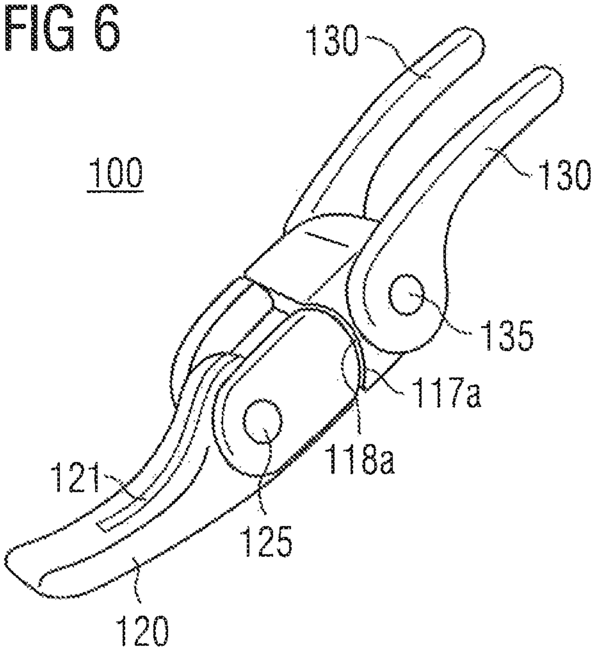

In FIG. 4 and FIG. 6, the first handle element 120 is illustrated in single-part form, and the second handle element 130 is illustrated in two-part form. This allows the handle elements 120, 130 to be easily folded in, and furthermore allows the handle elements 120, 130 to be folded in such that they come to lie one inside the other. Both allow a space-saving arrangement adjacent to the telescopic arm 110.

Furthermore, it is also possible for one of the end pieces 117, 118 to be of two-part form, such that the single-part handle element 120 is arranged rotatably in between and, in the folded-in state, lies between the two parts of the end piece (see end piece 117 in FIG. 4 and end piece 118 in FIG. 6).

In particular, the handle element 120 of single-part form may have a recess 121 in which the first tool 180 is arranged when the first handle element 120 is laid against the telescopic arm 110. The tool 180 is thus stowed in a protected and compact manner in the multipurpose tool 100.

Figure 5:
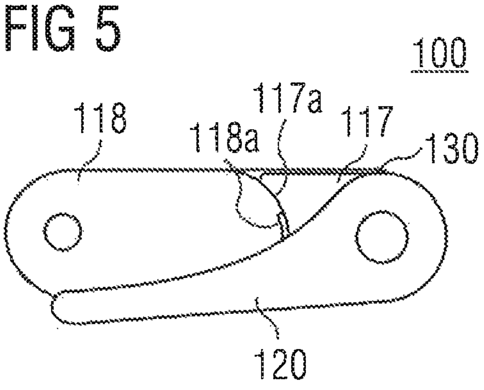
FIGS. 5 to 8 schematically show various states of use of a multipurpose tool.
Figure 7:
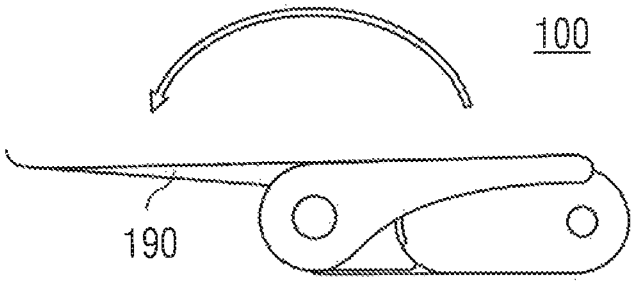
Figure 8:
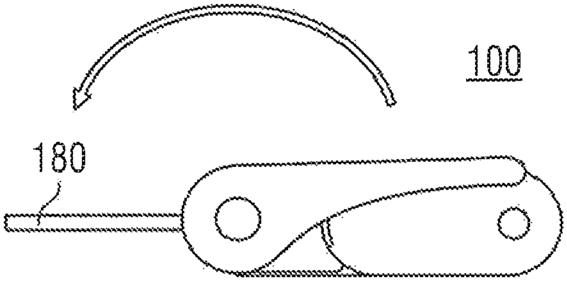

FIGS. 5 to 8 schematically show various states of the multipurpose tool 100. FIG. 5 illustrates the multipurpose tool 100 from FIG. 4 in the folded-together state. In FIG. 6, the handle elements 120, 130 have been folded out, such that the multipurpose tool 100 can be gripped at the handle element 120, while the two-part handle element 130 can be used as a tool. FIG. 7 illustrates the multipurpose tool 100 in the folded-in state, wherein only the second tool 190 has been folded out. Correspondingly, in FIG. 8, only the first tool 180 has been folded out, whereas all of the other parts of the multipurpose tool 100 have been folded in.

Figure 9:
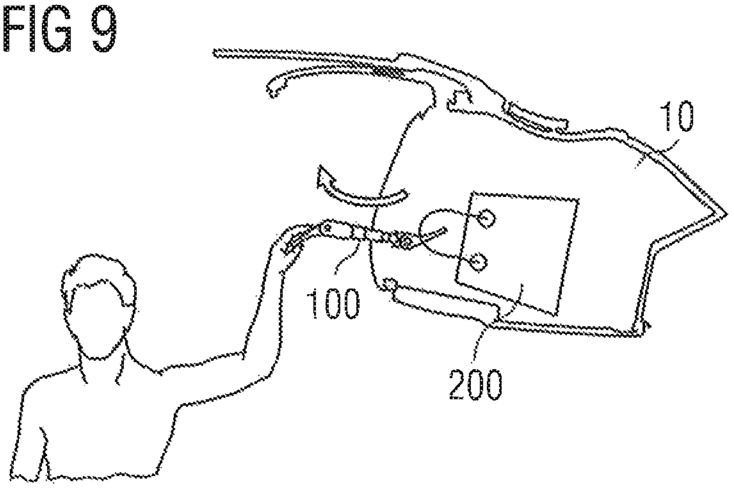
FIGS. 9 to 11 schematically show various possible uses of a multipurpose tool.
Figure 10:
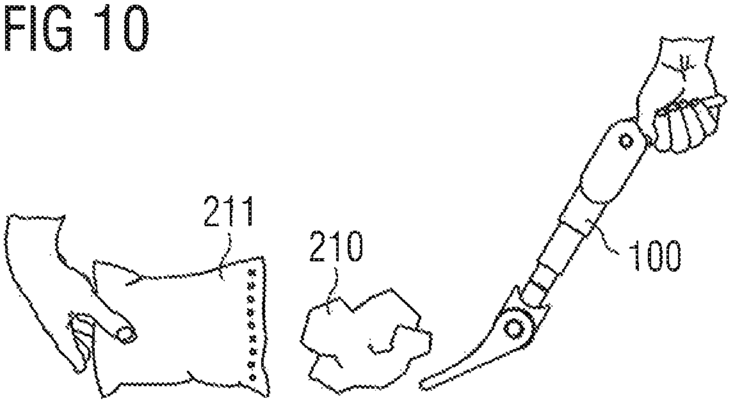
Figure 11:
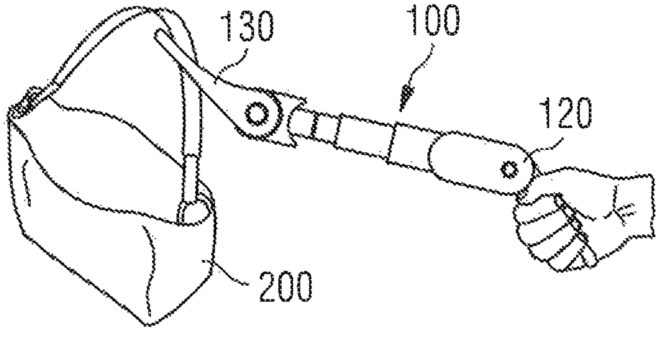

By means of these various structural forms resulting from folding-in and folding-out of the individual elements of the multipurpose tool 100, the multipurpose tool 100 can be used for different tasks. On the one hand, the multipurpose tool 100 can be used as the closing aid, illustrated in FIG. 1, for a flap 11 of a luggage compartment 10. On the other hand, the multipurpose tool 100 can be used for gripping an item of luggage (for example a bag 200), as illustrated in FIGS. 9 and 11. In particular, in the extended state of the telescopic arm 110, it is possible for a bag 200 to be pulled forward from a region of a luggage compartment 10 which is difficult to reach. By picking up a grip or strap of the bag 200 using the two-part handle element 130 (see FIG. 11) and turning the multipurpose tool 100 slightly, a bag 200 can be safely lifted and moved.

Finally, the multipurpose tool 100 can also be used for conveying discarded articles 210 for example into a refuse bag 211, without the need for the articles 210 to be touched by hand. Furthermore, by means of the extended telescopic arm 110, bending over can also be avoided or at least reduced.

The exemplary embodiments and variants described above serve merely for illustrating the invention. All examples, variants and individual details may be combined with one another as desired in order to form particular embodiments of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A multipurpose tool for flight attendants, the multipurpose tool comprising:

a telescopic arm;

a first handle element which is articulated on a first end of the telescopic arm;

a second handle element which is articulated on a second end of the telescopic arm, wherein the first handle element and the second handle element are configured to be laid against the telescopic arm, the first handle element and the second handle element being situated adjacent to one another when the telescopic arm has been collapsed; and a first tool with a pointed free end, the first tool being articulated on the first or second end of the telescopic arm and being configured to open a cover for an oxygen mask storage compartment of an aircraft.

2. The multipurpose tool as claimed in claim 1, the first handle element having a recess in which the first tool is arranged.

3. The multipurpose tool as claimed in claim 1, furthermore comprising a second tool with a flat free end, the second tool being articulated on the first or the second end of the telescopic arm and being configured to open or operate a cover for an oxygen mask storage compartment in an aircraft.

4. The multipurpose tool as claimed in claim 1, at least one of the first handle element or the second handle element having an outer coating at least in certain sections.

5. The multipurpose tool as claimed in claim 4, wherein the coating comprises a rubber lining.

6. The multipurpose tool as claimed in claim 1, furthermore comprising a locking device which is arranged in the telescopic arm and which is configured to block a collapse of the telescopic arm, the telescopic arm comprising at least two segments which are configured to be rotated relative to one another about a longitudinal axis of the telescopic arm, and the locking device being configured to be activated and deactivated by relative rotation of two of the segments.

7. The multipurpose tool as claimed in claim 1, the first handle element or the second handle element being of two-part form, and both parts of the two-part handle element having a common rotary axle by which they are articulated on the telescopic arm.

8. The multipurpose tool as claimed in claim 7, an other of the first and the second handle element being of single-part form, and the single-part handle element being arranged between the two parts of the two-part handle element when the first and the second handle elements lie against the telescopic arm.

9. The multipurpose tool as claimed in claim 1, furthermore comprising:

a first end piece which is arranged on the first end of the telescopic arm; and a second end piece which is arranged on the second end of the telescopic arm, each of the first and the second end pieces having a surface which faces toward an other of the first and the second end pieces, and the two surfaces having corresponding shapes which lie against one another when the telescopic arm has been collapsed.

10. A multipurpose tool for flight attendants, the multipurpose tool comprising:

a telescopic arm;

a first handle element which is articulated on a first end of the telescopic arm; and, a second handle element which is articulated on a second end of the telescopic arm, wherein the first handle element and the second handle element are configured to be laid against the telescopic arm, the first handle element and the second handle element being situated adjacent to one another when the telescopic arm has been collapsed, wherein at least one of the first handle element or the second handle element having an outer coating at least in certain sections, wherein the coating comprises a rubber lining.

11. A multipurpose tool for flight attendants, the multipurpose tool comprising:

a telescopic arm;

a first handle element which is articulated on a first end of the telescopic arm;

a second handle element which is articulated on a second end of the telescopic arm, wherein the first handle element and the second handle element are configured to be laid against the telescopic arm, the first handle element and the second handle element being situated adjacent to one another when the telescopic arm has been collapsed, a first end piece which is arranged on the first end of the telescopic arm; and a second end piece which is arranged on the second end of the telescopic arm, wherein each of the first and the second end pieces having a surface which faces toward an other of the first and the second end pieces, and the two surfaces having corresponding shapes which lie against one another when the telescopic arm has been collapsed.

* * * * *